(12) United States Patent
Huang et al.

(10) Patent No.: US 11,036,614 B1
(45) Date of Patent: Jun. 15, 2021

(54) DATA CONTROL-ORIENTED SMART CONTRACT STATIC ANALYSIS METHOD AND SYSTEM

(71) Applicant: PEKING UNIVERSITY, Beijing (CN)

(72) Inventors: Gang Huang, Beijing (CN); Huaqian Cai, Beijing (CN); Yun Ma, Beijing (CN); Jiamei Huang, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 0 days.

(21) Appl. No.: 17/154,003

(22) Filed: Jan. 21, 2021

(30) Foreign Application Priority Data

Aug. 12, 2020 (CN) .......................... 202010809497.7

(51) Int. Cl.
*G06F 11/36* (2006.01)
*G06F 9/455* (2018.01)
*G06F 8/41* (2018.01)

(52) U.S. Cl.
CPC .......... *G06F 11/3608* (2013.01); *G06F 8/425* (2013.01); *G06F 8/433* (2013.01); *G06F 9/45508* (2013.01)

(58) Field of Classification Search
CPC ...... G06F 11/3608; G06F 8/425; G06F 8/433; G06F 9/45508
USPC ........................................................ 717/131
See application file for complete search history.

(56) References Cited

U.S. PATENT DOCUMENTS

2011/0321016 A1* 12/2011 Haviv ....................... G06F 8/75
717/128
2020/0285563 A1* 9/2020 Murthy ............... G06F 11/3612

* cited by examiner

*Primary Examiner* — Chat C Do
*Assistant Examiner* — Bradford F Wheaton
(74) *Attorney, Agent, or Firm* — Bayramoglu Law Offices LLC (57) ABSTRACT

A data-control-oriented program static analysis method includes: compiling and interpreting a code of a smart contract to generate a bytecode of the code of the smart contract; resolving a control-flow relation between instructions of the bytecode, and building and printing a control-flow graph according to the control-flow relation; adding a taint source in the smart contract to an analysis result of a starting block of the control-flow graph, traversing the control-flow graph, performing a data dependence analysis based on a taint analysis technique, continuously updating an analysis result of a basic block in the control-flow graph; predefining an expression form of an analysis result and a basic operation related to the analysis result for the static analysis, controlling an updating of the analysis result according to a definition, and returning a final analysis result; and according to the final analysis result, generating and returning an analysis report.

9 Claims, 7 Drawing Sheets

DATA CONTROL-ORIENTED SMART CONTRACT STATIC ANALYSIS METHOD AND SYSTEM

CROSS REFERENCE TO THE RELATED APPLICATIONS

This application is based upon and claims priority to Chinese Patent Application No. 202010809497.7, filed on Aug. 12, 2020, the entire contents of which are incorporated herein by reference.

TECHNICAL FIELD

The disclosure relates to the field of communication technologies, and more particularly, to a data-control-oriented program static analysis method and a data-control-oriented program static analysis system.

BACKGROUND

A smart contract is an executable code deployed on a blockchain, which provides a trusted execution environment for the smart contract. In addition to the traditional smart contract taking Ethereum as an example applied in the field of cryptocurrency, the smart contract has been widely used in finance, voting, supply chain, e-commerce and other fields now. Once being executed on a blockchain, the smart contract is irreversible. Therefore, it is necessary to find potential vulnerabilities before executing the smart contract.

Program static analysis is the main means to find vulnerabilities of the program before execution. As a special program, static analysis for domain-specific targets needs to be carried out for the smart contracts in different fields so as to ensure accurate operation of the smart contracts. However, the existing methods for performing static analysis on the smart contracts are only applicable to the field of cryptocurrency, such as integer overflow, Fallback detection and the like.

With the wide use of the blockchain in different fields, a blockchain platform for data full lifecycle control has emerged. In the platform, original data is not recorded in a ledger like transaction data of the cryptocurrency and shared by all participants for the purpose of guaranteeing rights and interests of data owners. Instead, data users request the data owners by providing smart contracts. The data owners need to audit whether the smart contracts use their data reasonably and legally before the users can use the data. At present, the data-control-oriented blockchain platform is still lack of corresponding static analysis methods of smart contracts, and it is inefficient and costly for the data users to completely audit the smart contracts manually.

SUMMARY

In light of the above problems, embodiments of the disclosure are proposed so as to provide a data-control-oriented program static analysis method and a data-control-oriented program static analysis system that overcome the above problems or at least partially solve the above problems.

In order to solve the foregoing problems, an embodiment of the disclosure provides a data-control-oriented program static analysis method, wherein the method includes: compiling and interpreting a code of a smart contract by using a contract language converter, a contract language compiler and a bytecode extractor to generate a bytecode of the code of the smart contract; resolving a control-flow relation between instructions of the bytecode by using a bytecode manipulation framework, and building and printing a control-flow graph according to the control-flow relation; adding a taint source in the smart contract to an analysis result of a starting block of the control-flow graph, traversing the control-flow graph, performing data dependence analysis based on a taint analysis technique, continuously updating an analysis result of a basic block in the control-flow graph, and completing static analysis on the smart contract; predefining an expression form of the analysis result and a basic operation related to the analysis result for the static analysis, controlling updating of the analysis result according to the definition, and returning a final analysis result; and according to the final analysis result, generating and returning an analysis report.

Optionally, the compiling and interpreting the code of the smart contract by using the contract language converter, the contract language compiler and the bytecode extractor to generate the bytecode of the code of the smart contract, includes: by using the contract language converter, grouping tokens into a token class, and translating a user-defined syntax of a contract language into lexical analysis; by using the contract language compiler, constructing an abstract syntax tree according to the lexical analysis to complete the compiling process; and further processing the abstract syntax tree by using the bytecode extractor to complete remaining steps of semantic analysis and code generation of the compiling process and finally generate the bytecode.

Optionally, the resolving the control-flow relation between the instructions of the bytecode by using the bytecode manipulation framework, and building and printing the control-flow graph according to the control-flow relation, includes: by using the bytecode manipulation framework ASM, extracting and resolving a bytecode instruction sequence of a bytecode file; according to a preset establishment standard for the basic block of the control-flow graph, adding the corresponding bytecode instruction sequence to the basic block of the control-flow graph, namely, establishing the basic block of the control-flow graph; according to a determining standard for the execution flow direction between basic blocks, building an execution flow direction between the basic blocks; and building and printing the control-flow graph.

Optionally, the by using the bytecode manipulation framework ASM, extracting and resolving the bytecode instruction sequence of the bytecode file, includes:

providing an event based bytecode manipulation model by the bytecode manipulation framework ASM by using a Core API, and providing an object based bytecode manipulation model by the bytecode manipulation framework ASM by using a Tree API.

Optionally, the by using the bytecode manipulation framework ASM, extracting and resolving the bytecode instruction sequence of the bytecode file, includes: rebuilding an objectified class file into a bytecode file in a binary format by the event based bytecode manipulation model by using a Visitor and an implementation class thereof, and extracting and resolving the bytecode instruction sequence of the bytecode file; and resolving each bytecode file by the object based bytecode manipulation model by using an object tree structure, rebuilding a new bytecode file by using a Node and an implementation class thereof, and extracting and resolving the bytecode instruction sequence of the bytecode file; wherein the bytecode file is a class file, providing information selected from a class name, a class attribute and a bytecode instruction set.

Optionally, the adding the taint source in the smart contract to the analysis result of the starting block of the control-flow graph, traversing the control-flow graph, performing the data dependence analysis based on the taint analysis technique, continuously updating the analysis result of the basic block in the control-flow graph, and completing the static analysis on the smart contract, includes: adding a taint label for a common variable in the smart contract to become a taint variable and complete identification of the taint source; and performing innocent processing to the taint variable, wherein the taint variable that has been innocent processed propagates dependency relations with other common variables, and is finally converged to a taint sink to complete taint propagation analysis.

Optionally, the predefining the expression form of the analysis result for the static analysis, includes:

for designing and simulating an execution process of the bytecode in a virtual machine, predefining a stack-frame structure to simulate a transmission process of the taint source in a local-variable table along with a local variable of a program; and for a global variable, predefining a heap object to represent an instance object in the global variable, wherein reference to a labeled instance object is also able to be transmitted in the local-variable table.

Optionally, the predefining the basic operation related to the analysis result for the static analysis, includes:

predefining an operation of merging analysis results of executing a plurality of instructions for merging the analysis results after executing the plurality of instructions in the basic block of the control-flow graph; predefining an operation for determining whether two analysis results has an inclusion relation, which is used for, according to changes of the analysis results before and after executing the basic block in the control-flow graph, determining whether the analysis result before executing the basic block is included in the analysis result after executing the basic block; predefining an operation of merging analysis results of the basic block, which is used for, according to changes of the analysis results before and after executing the basic block in the control-flow graph, merging the analysis result before executing into the analysis result after executing; predefining a cloning operation of the analysis results for realizing the merging of the analysis results; and predefining an operation of printing the analysis results for, according to the stack-frame structure, simulating a transmission process of a taint source of the program along with the variable in the program, and printing the analysis results so as to visually view a taint propagation process.

Optionally, the according to the final analysis result, generating and returning the analysis report, includes: based on a breadth-first search algorithm (BFS) of graph and in a hierarchical traversing manner, analyzing and integrating analysis results of all subsequent basic blocks of the current basic block in the control-flow graph, putting the analysis results into a set of the final analysis results, and according to the set of final analysis results, generating and returning the analysis report.

An embodiment of the disclosure further provides a data-control-oriented program static analysis system, wherein the system specifically includes:

a bytecode rebuilding module used to compile and interpret a code of a smart contract by using a contract language converter, a contract language compiler and a bytecode extractor to generate a bytecode of the code of the smart contract;

a control-flow-graph building module used to resolve a control-flow relation between instructions of the bytecode by using a bytecode manipulation framework, and build and print a control-flow graph according to the control-flow relation;

a static analysis module used to add a taint source in the smart contract to an analysis result of a starting block of the control-flow graph, traverse the control-flow graph, perform data dependence analysis based on a taint analysis technique, continuously update an analysis result of a basic block in the control-flow graph, and complete static analysis on the smart contract;

an analysis-result controlling module used to predefine an expression form of the analysis result and a basic operation related to the analysis result for the static analysis, control updating of the analysis result according to the definition, and return a final analysis result; and an analysis-report exporting module used to, according to the final analysis result, generating and returning an analysis report.

It can be seen from the above technical solutions that the embodiments of the disclosure provide the data-control-oriented program static analysis method and system, which start from a function realization aspect of a smart contract analysis tool and are oriented to control requirements of data use, reconstruct the bytecode by compiling and interpreting the smart contract code, build and print the control-flow graph based on the analysis of the bytecode, traverse the control-flow graph of a bytecode level, perform data dependence analysis on the taint source based on the taint analysis technique, acquire the final analysis result, can define data constraints based on different data control strategies and carry out static analysis, meet the requirements of automatic audit of the data-control-oriented smart contracts, and ensure the accurate operation and data control of the smart contract on a data-control-oriented blockchain platform.

DETAILED DESCRIPTION OF THE EMBODIMENTS

The following clearly and completely describes the technical solutions in the embodiments of the disclosure with reference to the accompanying drawings in the embodiments of the disclosure. Apparently, the described embodiments are merely some but not all of the embodiments of the disclosure. Based on the embodiments of the disclosure, all other embodiments obtained by those of ordinary skills in the art without going through any creative work shall fall within the scope of protection of the disclosure.

Figure 1:
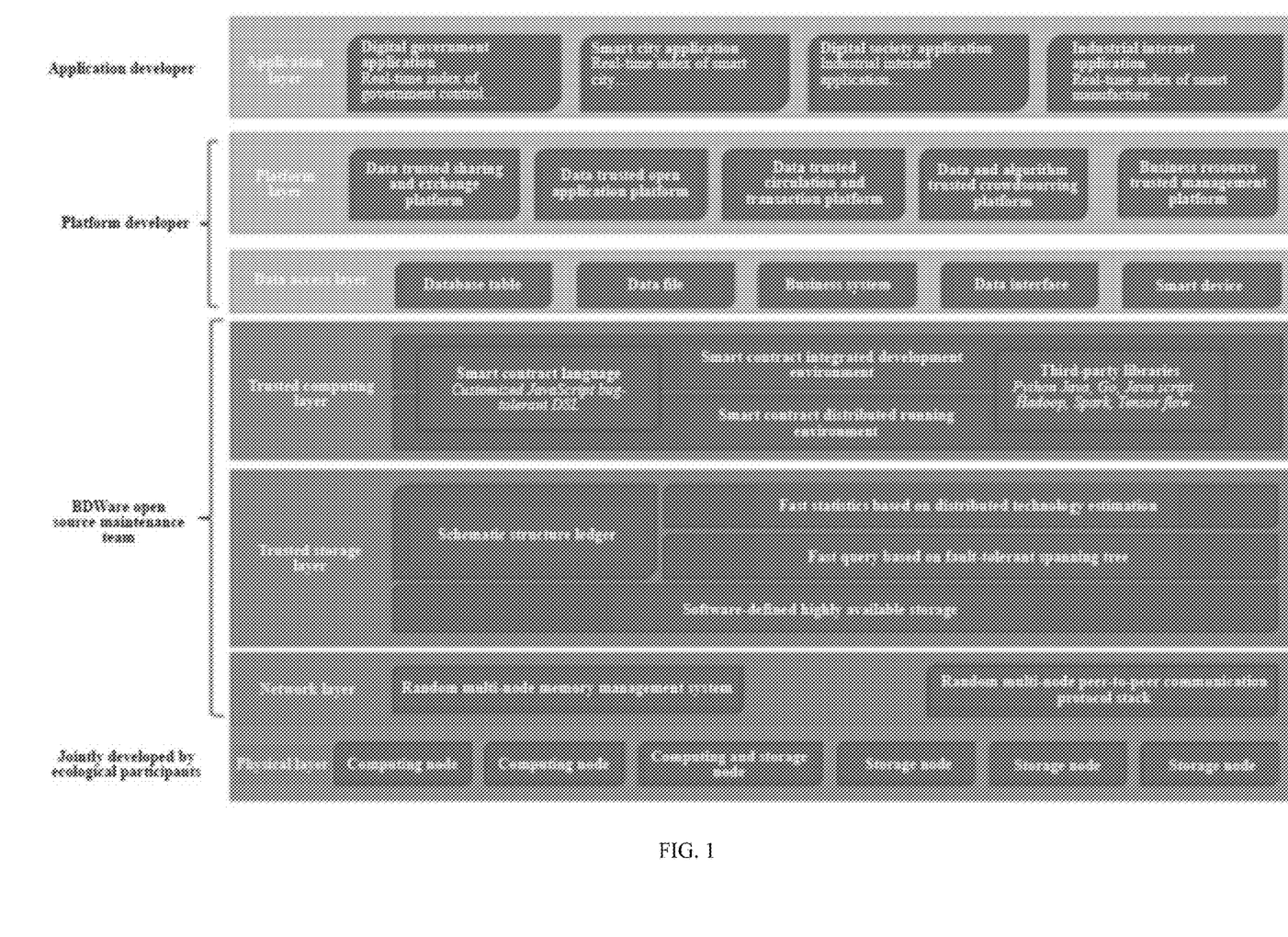
FIG. 1 is a technical architecture diagram of a data-control-oriented blockchain platform.

FIG. 1 illustrates a technical architecture diagram of a data-control-oriented of blockchain platform, a trusted computing layer of which provides third-party library invoking modules of a contract development environment, a running environment and other programming languages around a smart contract language. The data-control-oriented of blockchain platform realizes trusted computing of random multinode mutual verification, and supports invoking an interface of a trusted storage layer to store information of a contract execution process in the trusted storage layer.

Figure 2:
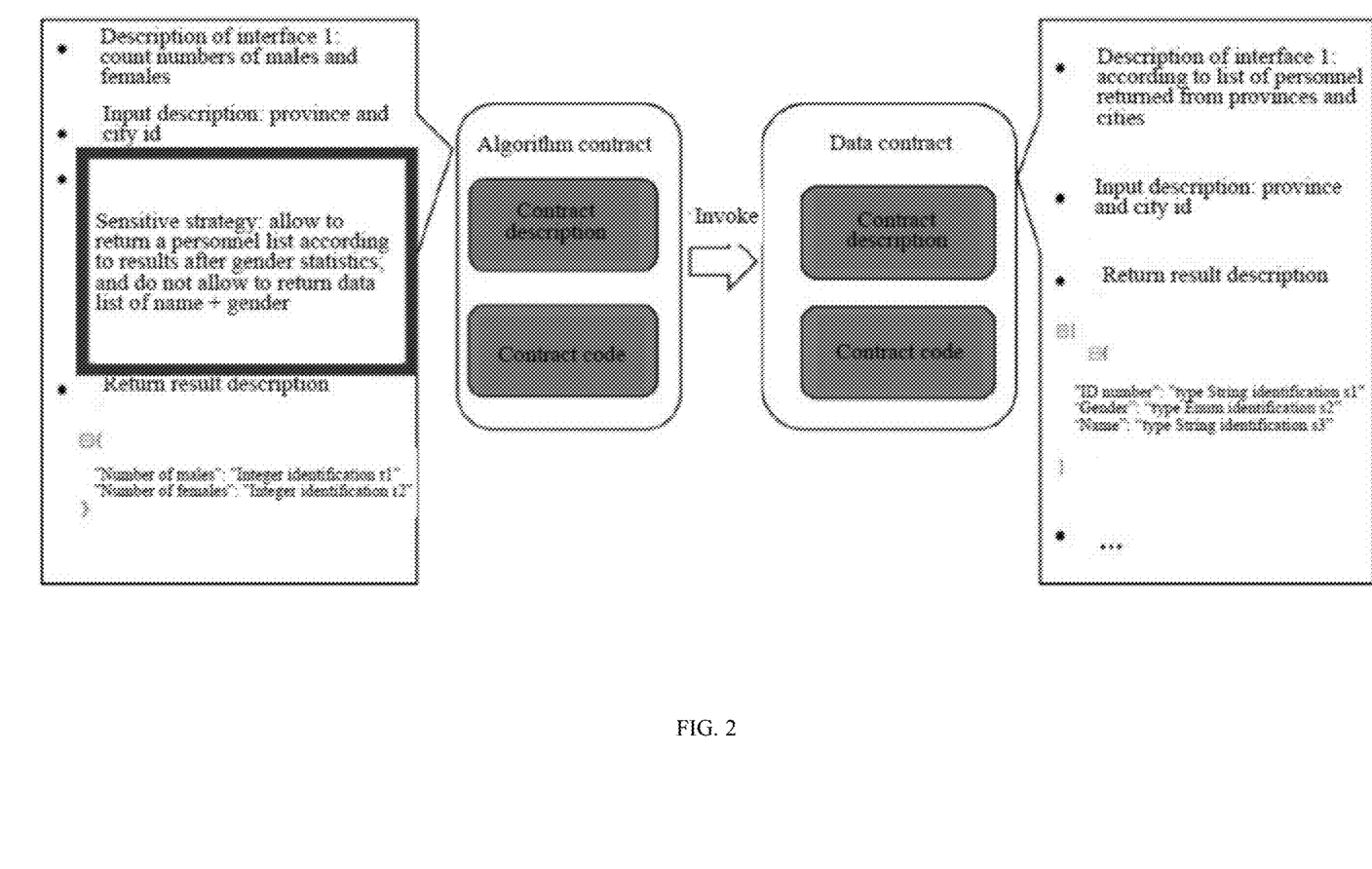
FIG. 2 is an example diagram of a smart contract based data privacy protection strategy.

FIG. 2 illustrates an example diagram of a smart contract based data privacy protection strategy. As shown in FIG. 2, the example counts numbers of males and females through types of contracts: an algorithm contract written by a data user and a data contract invoked by the algorithm contract. As shown in the figure, because the algorithm contract has a sensitive strategy of data privacy protection, the algorithm contract allows to return a personnel list according to results returned after the gender statistics, but does not allow to return a data list containing names and genders, i.e., the algorithm contract only allows to return the statistical results of gender ratio, rather than an original data list containing names and genders in one-to-one correspondence. Therefore, based on the sensitive strategy, a data owner needs to audit the algorithm contract to determine whether the algorithm contract meets the sensitive strategy. For the data owner, it is inefficient and costly to completely rely on labor to determine whether the smart contract uses data reasonably and legally (i.e., to audit whether the smart contract conforms to the data privacy protection strategy).

On the one hand, the smart contract language of the current data-control-oriented of blockchain platform is not a mainstream programming language such as C, C++, Java or JavaScript, but a self-customized JavaScript-like language. On the other hand, an existing code static analysis framework is applied to check potential vulnerabilities such as code style and syntax errors, while the smart contract for the data-control-oriented of blockchain platform requires a static analysis tool to define data constraints and perform static analysis based on specific data control strategies. Therefore, the existing code static analysis framework cannot be used for the static analysis of the smart contract for the data-control-oriented of blockchain platform.

First Embodiment

Figure 3:
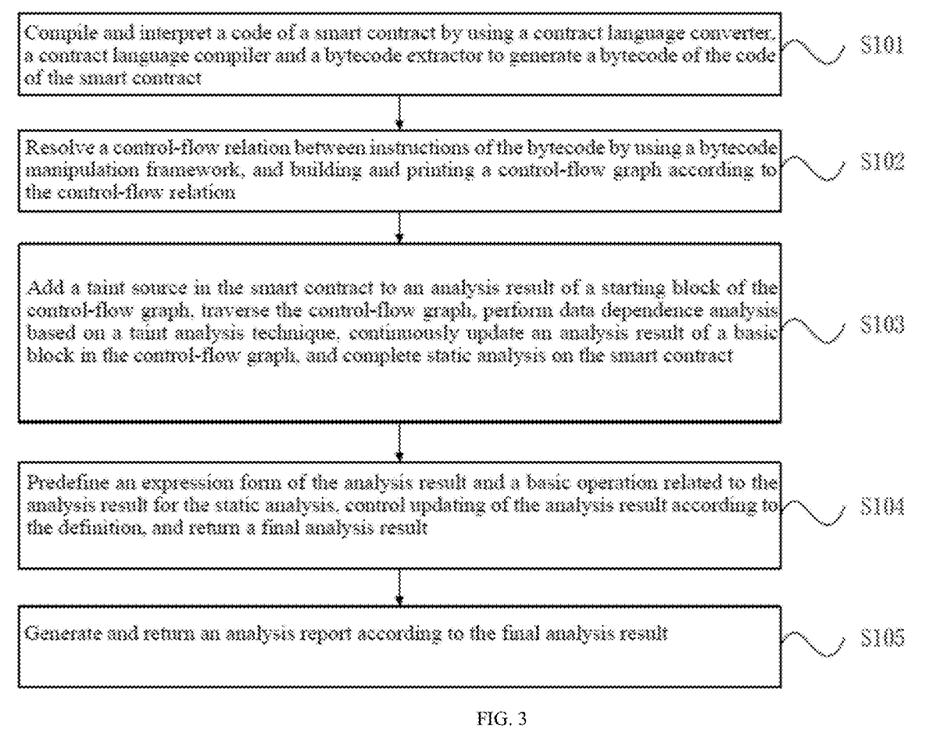
FIG. 3 is a flow chart of steps of a data-control-oriented program static analysis method provided by the disclosure.

FIG. 3 is a flow chart of steps of a data-control-oriented program static analysis method provided by the disclosure. As shown in FIG. 3, the method provided by the disclosure may be applied to a data-control-oriented blockchain platform, and specifically includes the following steps.

In step S101, a smart contract code is compiled and interpreted through a contract language converter, a contract language compiler and a bytecode extractor to generate a bytecode of the code of the smart contract.

In a preferred embodiment provided by the embodiment, tokens are grouped into a token class, and a user-defined syntax of a contract language is translated into lexical analysis by using the contract language converter; an abstract syntax tree is built according to the lexical analysis to complete the compiling process by using the contract language compiler; and the abstract syntax tree is further processed by using the bytecode extractor to complete remaining steps of semantic analysis and code generation of the compiling process and finally generate the bytecode for a static analysis framework to use.

In the embodiment of the disclosure, the contract language converter and the contract language compiler are selected according to a programming language of the smart contract.

Figure 4:
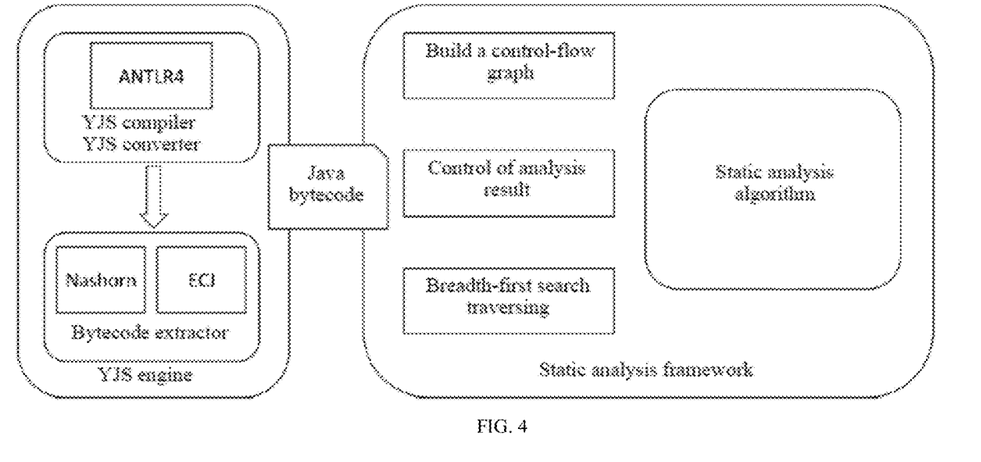
FIG. 4 is a schematic diagram of a static analysis architecture of a YJS language smart contract provided by an embodiment of the disclosure.

FIG. 4 illustrates a schematic diagram of a static analysis architecture of a YJS language smart contract provided by an embodiment of the disclosure. As shown in FIG. 4, a JavaScript-like YJS language is taken as an example. Functions of the contract language converter and the contract language compiler may be realized by a compiling conversion module ANTLR4 (Another Tool for Language Recognition). Firstly, a contract source code of a smart contract written by the YJS language is subjected to lexical analysis and syntax analysis, and an Abstract Syntax Tree (AST) is built. Meanwhile, the YJS language is converted into the JavaScript-like language. ANTLR may syntactically generate a resolver that may build and traverse an analytic tree, and support compilation of a Domain Specific Language (DSL). ANTLR consists of two parts, which are respectively a lexer and a parser. LEXER is responsible for translating the user-defined syntax into a lexical analyzer, i.e., grouping the tokens into a token class. PARSER is responsible for building the abstract syntax tree according to morphology and completing compilation.

As shown in FIG. 4, in the embodiment of the disclosure, a Java bytecode extraction module composed of a Nashorn engine and an Eclipse compiler ECJ (Eclipse Compiler for Java) is selected as a byte extractor for static analysis of the YJS language smart contract. Nashorn extends an ability of Java to run a dynamic JavaScript on JVM, and can realize mutual invoking between Java and JavaScript. The Eclipse compiler ECJ further processes the generated abstract syntax tree to complete remaining steps of semantic analysis and code generation of the compiling process and finally generate a Java bytecode for a static analysis module to use. Compared with a traditional Javac compiler attached to Sun JDK, the Eclipse compiler ECJ allows an incorrectly compiled code to run, so that the whole program can still run well even if there are wrong code blocks.

In step S102, a control-flow relation between orders of the bytecode is resolved through a bytecode manipulation framework, and building and printing a control-flow graph according to the control-flow relation.

The CFG (Control Flow Graph), also called a program control-flow graph, is an abstract representation of a process or program, which represents all paths that a program will traverse during execution, and is an important tool for compiler optimization and program static analysis. The control-flow graph consists of two parts: a basic block and an execution flow direction. The basic block is the largest unit that may be continuously executed in a program or the smallest unit that controls the program, and is characterized by single entry, single exit and no branch in the middle. The execution flow direction represents a connecting line between two basic blocks.

Constructing a control-flow graph based on source code analysis belongs to forward program analysis, which analyzes a control flow therein by building and then traversing the Abstract Syntax Tree (AST) to build the control-flow graph. There are often syntax structures such as branches, loops and exception handling for a programming language with structured programming characteristics, which imply a discontinuous control flow. Therefore, these implicit control flow information cannot be directly acquired from AST, and the AST needs to be converted into a finer-grained Intermediate Representation (IR) that exposes the implicit control flow. Therefore, three steps are needed to build the control-flow graph based on the source code analysis: building the abstract syntax tree, generating the intermediate representation and constructing the control-flow graph.

Building the control-flow graph based on the bytecode analysis belongs to reverse program analysis, which can better support the taint analysis technique to work in comparison to building the control-flow graph based on the source code analysis.

Figure 5:
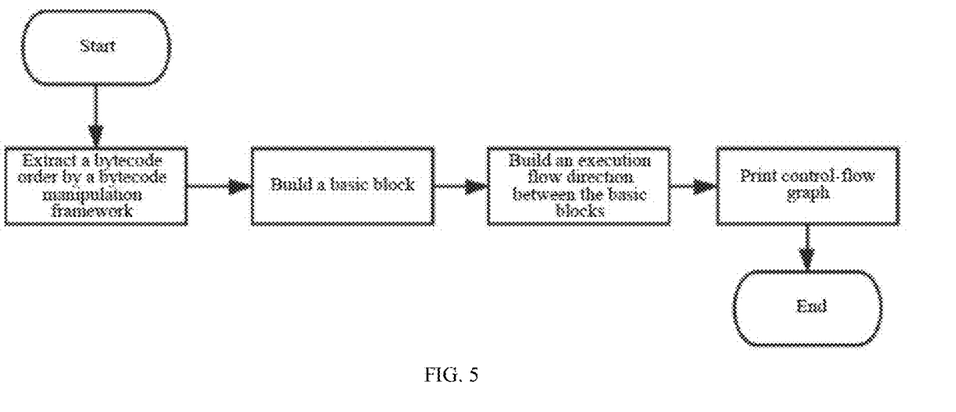
FIG. 5 is a flow chart of constructing and printing a control-flow graph based on a bytecode provided by the embodiment of the disclosure.

FIG. 5 illustrates a flow chart of building and printing a control-flow graph based on a bytecode provided by the embodiment of the disclosure. As shown in FIG. 5, in a preferred embodiment provided by the disclosure, a first step is to extract and resolve a bytecode instruction sequence of a bytecode file through a bytecode manipulation framework ASM; a second step is to add a corresponding bytecode instruction sequence to the basic block of the control-flow graph according to a preset establishment standard for the basic block of the control-flow graph, namely, establish the basic block of the control-flow graph; a third step is to build an execution flow direction between the basic blocks according to a determining standard for the execution flow direction between the basic blocks; and a fourth step is to build and print the control-flow graph.

In the embodiment of the disclosure, the optional bytecode manipulation frameworks include: Soot, ASM and BCEL. ASM (Assembly) is a Java bytecode manipulation framework, which may be used to dynamically generate classes or enhance functions of the existing classes. ASM can dynamically modify behaviors of a class by reading, converting, writing and other operations before loading the class into JVM, so as to enhance the class, and even directly generate a new class.

In the embodiment of the disclosure, the bytecode manipulation framework ASM provides an event based bytecode manipulation model by using a Core API; and, the bytecode manipulation framework ASM provides an object based bytecode manipulation model by using a Tree API.

Table 1 illustrates attribute comparison between the event based bytecode manipulation model and the object based bytecode manipulation model.

As shown in Table 1, the event based bytecode manipulation model has fast processing speed and occupies less memory, but is difficult to realize class conversion. The object based bytecode manipulation model is easy to implement class conversion, but has slow speed, occupies more memory and has relatively low performances. Therefore, the two bytecode manipulation models selected in the disclosure can complement each other. For example, when adding annotations containing content digital signatures to a class, the Core API needs to read the bytecode twice through the ClassReader. Because computing of the digital signatures needs to be performed in the Core API after contents of all the classes are accessed, while annotations cannot be added at this time, and needs to be implemented by reading the bytecode again through the ClassReader. However, the Tree API can be directly added in such a case.

Figure 6:
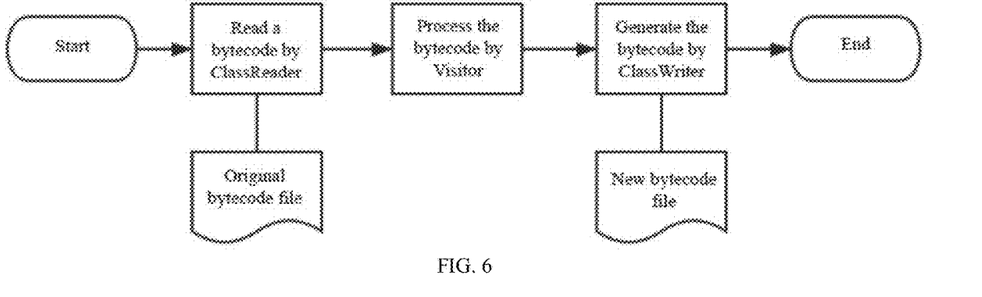
FIG. 6 is a flow chart of processing the bytecode by an event based bytecode manipulation model provided by the embodiment of the disclosure.

FIG. 6 illustrates a flow chart of processing the bytecode by the event based bytecode manipulation model provided by the embodiment of the disclosure.

As shown in FIG. 6, in the embodiment of the disclosure, the event based bytecode manipulation model rebuilds an objectified class file into a bytecode file in a binary format by using a Visitor and an implementation class thereof, and extracting and resolving the bytecode instruction sequence of the bytecode file, which specifically includes the following steps. In a first step, a ClassReader class reads a bytecode; and outputs an original bytecode file meanwhile; in a second step, a Visitor class processes the read bytecode; in a third step, a Classwriter class generates a new bytecode and outputs a new bytecode file; and in a fourth step, the bytecode processing is ended.

In the embodiment of the disclosure, the bytecode processing flow of the object based bytecode manipulation model is similar to that of the event based bytecode manipulation model, with the difference that the object based bytecode manipulation model uses the object tree structure to resolve each bytecode file, rebuilds the new bytecode file by using the Node and various implementation classes thereof, and then extracts and resolves the bytecode instruction sequence of the bytecode file.

The bytecode file is a class file, providing information selected from a class name, a class attribute and a bytecode instruction set.

Table 2 illustrates some classes of the bytecode manipulation framework ASM provided by the embodiment of the disclosure.

TABLE 1

| Model | Event Based | Object Based |
| --- | --- | --- |
| API | Core API (org.objectweb.asm) | Tree API (org.objectweb.asm.tree) |
| XML analogy | SAX (Simple API for XML, event-driven model for processing XML) | DOM (Document Object Model) |
| Constitution of class | A series of events | Tree composed of stack-frame structure objects |
| Advantages | Fast speed and less occupied memory | Easy class conversion |
| Disadvantages | Difficult to implement class conversion | Slow speed and more occupied memory |

TABLE 2

| Subordinated API | Class name | Notes |
| --- | --- | --- |
| Core API | ClassVisitor | A visitor class, which defines access methods of classes, class annotations, class members and class methods and returns corresponding visitor object instances. |
| | ClassReader | A class resolver, which resolves related contents of the classes and accepts the access of the class implemented by ClassVisitor objects. |

TABLE 2-continued

| Subordinated API | Class name | Notes |
|---|---|---|
| | MethodVisitor | A visitor class, which defines a method of directly accessing bytecode orders in the class methods. |
| | Label | A label class, which is used to label a position of a bytecode order in a program file, and acts as a label when Jump orders such as Jump, goto and switch, and try catch exception capture blocks are encountered. |
| | Opcodes | An operation code class, which defines an operation code, an access token and an array type code of JVM. |
| | Type | Defined class members and method types. |
| | Handle | Defined class members and references to methods. |
| Tree API | ClassNode | A class node class, wherein one class represents one node, the class is inherited from the ClassVisitor class, also implements class access, and is similar to the ClassReader class of the Core API. |
| | MethodNode | A method node class, inherited from the MethodVisitor class, wherein one method is one node. |
| | AbstractInsnNode | An order node class, wherein one bytecode order represents one node. |
| | InsnList | An order sequence class used for operating an order sequence composed of multiple bytecode orders. |
| | LabelNode | A label node class, inherited from the AbstractInsnNode class and similar to the Label class of the Core API, wherein one label is one node. |
| | TryCatchBlockNode | An exception catch block node class. |

As shown in Table 2, the embodiment of the disclosure integrates the Core API and the Tree API of the ASM framework to read the bytecode file, extract and resolve the bytecode orders for building the program control-flow graph. ClassReader and AbstractInsnNode both act as class resolvers, resolving class members, methods, annotations and other related contents, receiving ClassVistor objects, invoking access methods of the ClassVistor class and returning responded visitor objects. MethodVisitor and MethodNode act as visitors, defining methods of directly accessing the bytecode orders in class methods. The visitor objects returned by the class resolver are used to directly access the bytecode orders in the class methods.

The basic block in the control-flow graph refers to a statement sequence consisting of multiple continuous statements in the program, with only one entry and one exit. The first statement in the statement sequence is the entry and the last one is the exit, and the execution of the basic block may only start from the entry and end from the exit. Specifically, only one entry means that no statement anywhere else in the program can enter this basic block through a jump class order. Only one exit means that only the last order in the program can lead to other basic blocks for execution. Therefore, a typical feature of the basic block is that as long as a first order of the basic block is executed, all other orders in the basic block will be executed in sequence and executed only once.

The basic blocks in the control-flow graph built by the embodiment of the disclosure are composed of byte code order sequences instead of traditional program statement sequences. After extracting and resolving the bytecode instruction sequence, the corresponding bytecode instruction sequence needs to be added to the basic block according to a preset establishment standard for the basic block to establish the basic block. According to the embodiment of the disclosure, the bytecode orders are classified in advance to determine the establishment standard for the basic block.

Table 3 illustrates classification of JAVA bytecode orders provided by the embodiment of the disclosure as an example.

TABLE 3

| Order type | Order code type | Order example | Order descriptions |
|---|---|---|---|
| kInstrCanBranch | 1 | ifeq, ifnull, if_icmpeq, GOTO, tableswitch, lookupswitch, . . . | Conditional control statements such as if, while, for and switch |
| kInstrCanContinue | 2 | nop, iconst_0, bipush, Idc, iload_0, istore_0, dup, pop, iadd, jsr, ret, getstatic, . . . | General arithmetic statements that can jump directly to next statement in sequence |
| kInstrCanThrow | 4 | invokevirtual, invokespecial, invokestatic, invokeinterface, invokedynamic | Exception throw statement while invoking a function |
| kInstrCanReturn | 5 | ireturn, areturn, return, athrow, | Return statements |
| kInstrInvoke | 6 | invokevirtual, invokespecial, invokestatic, invokeinterface, invokedynamic | Function invoking statements |

As shown in Table 3, Java bytecode orders in the embodiment of the disclosure are divided into five types, which are respectively the branch order kInstrCanBranch, the common arithmetic order kInstrCanContinue, the exception throw order kInstrCanThrow, the return order kInstrCanReturn and the function invoking order kInstrInvoke. According to the definition of the single entry and the single exit of the basic block, the last order of the basic block may lead to other basic blocks for execution. Taking the branch order for example, when a program is executed to the branch order, the program will jump to different order branches. Therefore, one basic block should be divided when the program is executed to the branch order. The return order, the exception throw order and the function invoking order are the same. Therefore, an establishment standard for the basic block is set in the embodiment of the disclosure according to the definition of the basic block.

FIG. 4 illustrates a establishment standard for a basic block provided by the embodiment of the disclosure.

TABLE 4

| Type of initial order | Type of end order | Corresponding program statements |
|---|---|---|
| kInstrCanContinue/null | kInstrCanReturn | return |
| kInstrCanContinue | kInstrCanThrow | throw |
| kInstrCanContinue | kInstrCanBranch | If, switch, for, and while |
| kInstrCanContinue | kInstrInvoke | Contract invoking, object evaluating, and the like. |

Referring to the establishment standard for the basic block shown in Table 4, if a type of an initial order and a type of an end order meet the standard, the orders may be added to the basic block to establish the basic block, i.e., when the start order is a common arithmetic order and the end order is a return order, an exception throw order or a function invoking order, the basic block may be divided. The start order may either be a common arithmetic order that jumps to next order in sequence, or may be empty, i.e., a return statement return may be separately used as a basic block.

Figure 7:
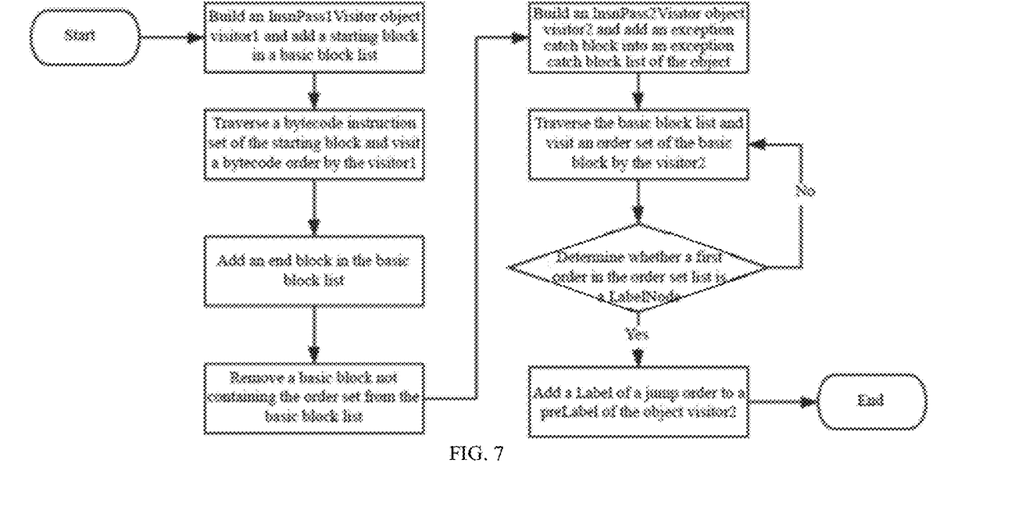
FIG. 7 is a flow chart of establishing a basic block provided by the embodiment of the disclosure.

FIG. 7 illustrates a flow chart of establishing a basic block provided by the embodiment of the disclosure, wherein a basic block is established according to a preset establishment standard for the basic block. As shown in FIG. 7, in the method of establishing the basic block according to the embodiment of the disclosure, two visitor objects visitor1 and visitor2 are defined, which are of the types of InsnPass1 Visitor and InsnPass2Visitor respectively. The InsnPass1 Visitor and InsnPass2Visitor classes are both inherited from the MethodVisitor class, and are respectively used to access common arithmetic order (kInstrCanContinue) and jumpable orders (kInstrCanReturn, kInstrCanThrow, Kinstrcanspan, and kInstrInvoke. The following steps are specifically included: a first step is to build an InsnPass1 Visitor object visitor1, and add a starting block to a basic block list; a second step is to traverse and access, by the visitor1, a bytecode instruction set of the starting block; a third step is to add an end block to the basic block list; a fourth step is to remove the basic blocks not including the order set from the basic block list; a fifth step is to build an InsnPass2Visitor object visitor2, and add an exception catch block to an exception catch block list of the object to set an exception catch block of the object; a sixth step is to traverse the basic block list, wherein the visitor2 traverses an order set of the basic block; a seventh step is to determine, by the visitor2, whether a first order in the order set is a LabelNode; if the first order in the order set is a LabelNode, go to an eight step; if the first order in the order set is not a LabelNode, go back to the sixth step; the eighth step is to add a Label of a jump order to a preLabel of the object visitor2, i.e., to label that a preorder block may jump to the current block, thus implementing division of the basic block; and a ninth step is to end the establishment of the basic block.

FIG. 5 illustrates a standard for building an execution flow direction between the basic blocks provided by the embodiment of the disclosure.

TABLE 5

| Pre-basic block | Post-basic block |
| --- | --- |
| Ended with an order of a kInstrCanBranch class | All subsequent blocks of the pre-basic block |
| Ended with an order of a kInstrInvoke class | Subsequent block of the pre-basic block |
| Ended with an order of a kInstrCanThrow class | All subsequent blocks of the pre-basic block |
| Ended with an order of a kinstrCanReturn class | End block |

As shown in Table 5, after the basic blocks are built, the execution flow direction between the basic blocks should be determined. The standard for building the execution flow direction between the basic blocks is preset in the embodiment of the present disclosure. As shown in Table 5, when two basic blocks satisfy the standard, an execution flow direction may be built between the pre-basic block and the post-basic block. For example, if the pre-basic block ends with an order of a kInstrCanBranch class, the basic block may jump to multiple branch blocks, and an execution flow direction may be established between the basic block and all subsequent blocks of the basic block.

Figure 8:
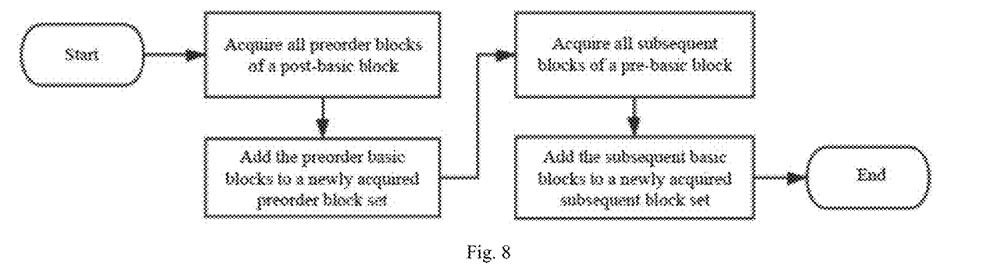
FIG. 8 is a flow chart of establishing an execution flow direction between the basic blocks provided by the embodiment of the disclosure.

After determining the standard for building the execution flow direction between the basic blocks, the execution flow between the basic blocks may be established. FIG. 8 illustrates a flow chart of establishing the execution flow direction between the basic blocks provided by the embodiment of the disclosure. As shown in FIG. 8, a first step is to acquire all pre-order blocks of the post-basic block; a second step is to add the pre-basic block to a preorder block set; a third step is to acquire all subsequent blocks of the pre-basic block; a fourth step is to add the post-basic block to a subsequent block set, so that the execution flow direction between the pre-basic block and the post-basic block may be established; and a fifth step is to end the establishing of the execution flow direction between the basic blocks.

When the execution flow between the basic blocks is established, a control-flow graph may be printed on a console to visually show a program execution process at a bytecode level. Since the execution of the program is based on methods (functions), the printed control-flow graph should include information such as method name and method descriptions in addition to the information of execution flow direction between the basic blocks.

Figure 9:
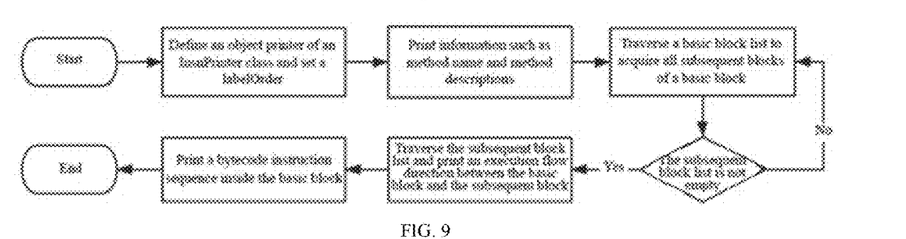
FIG. 9 is a flow chart of printing the control-flow graph provided by the embodiment of the disclosure.

FIG. 9 illustrates a flow chart of printing the control-flow graph provided by the embodiment of the disclosure. As shown in FIG. 9, in the embodiment of the disclosure, a first step is to define an object printer of an InsnPrinter class and set an labelOrder, wherein the InsnPrinter class is inherited from a MethodVisitor class, which defines a visitor object for bytecode order printing, and the labelOrder is a member variable of a CFGraph class, which defines an order label; a second step is to print the information such as the method name and the method descriptions; a third step is to traverse the basic block list to acquire all the subsequent blocks of the basic block, and if the subsequent block list of the current basic block is not empty, go to step 4; otherwise, continue traversing; a fourth step is to traverse the subsequent block list and print an execution flow direction between the basic block and the subsequent block; a fifth step is to traverse a bytecode instruction sequence in the basic block and print the bytecode order by using a printer visitor object; and a six step is to end the printing of the basic block.

In step S103, a taint source in the smart contract is added to an analysis result of a starting block of the control-flow graph, the control-flow graph is traversed, data dependence analysis is performed based on a taint analysis technique, an analysis result of the basic block in the control-flow graph is continuously updated, and static analysis on the smart contract is completed.

The taint analysis technique is a static analysis technology that analyzes whether taint sources of a program can be spread to the taint sinks without sanitizers.

Figure 10:
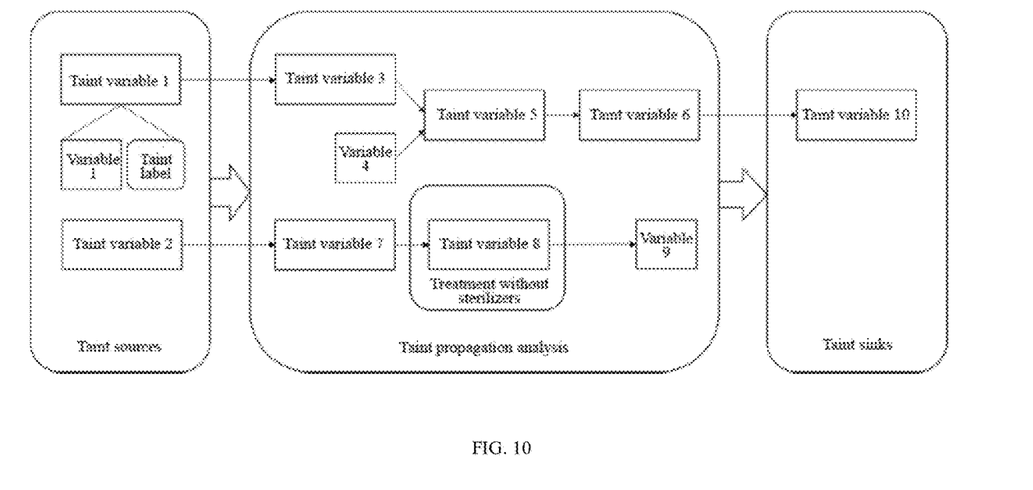
FIG. 10 is a schematic diagram of a taint analysis process provided by the embodiment of the disclosure.

FIG. 10 illustrates a schematic diagram of a taint analysis process provided by the embodiment of the disclosure. As shown in FIG. 10, the taint analysis may be abstracted into a triple <sources, sinks, sanitizers>, which is specifically divided into three stages: taint sources and taint sinks identification, treatment without sanitizers and taint propagation analysis.

First, the taint sources are identified, and common variables are added with taint labels to form taint variables; then, the taint propagation analysis is performed. After being treated without sanitizers, the taint variables propagate a pass-by-value dependency relation with the common variables, and are finally converge to the taint sinks.

In the embodiment of the disclosure, multiple static analysis algorithms may be selected on the basis of the control-flow graph to perform static analysis on the taint sources in the smart contract.

In the embodiment of the disclosure, the program control-flow graph visualizes the analysis results to more intuitively show the flow direction and dependency relation of data.

In step S104, an expression form of the analysis result and a basic operation related to the analysis result are predefined for the static analysis, and a final analysis result is returned.

The static analysis algorithm based on the taint analysis technique is to analyze how the taint sources propagate in program variables through the dependency relation. In a Java environment, when a compiled Java bytecode is executed in a Java virtual machine JVM, JVM will create a stack frame for each method, and each stack frame stores a local-variable table, an operand stack, a dynamic link, a return address and other information. Therefore, the local variables in the program are stored in the local-variable table of the stack frame, while for global variables in the program, constants and static member variables modified by static are stored in a method area, instance variables are stored in the method area, and references of the instance variables are stored in the local variables of the stack frame.

Therefore, the predefining the expression form of the analysis result for the static analysis in the embodiment of the disclosure, includes: for designing and simulating an execution process of the bytecode in a virtual machine, predefining a stack-frame structure to simulate a transmission process of the taint source in a local-variable table along with a local variable of a program; and for a global variable, predefining a heap object to represent an instance object in the global variable, wherein reference to a labeled instance object is also able to be transmitted in the local-variable table.

In the embodiment of the disclosure, it is necessary to traverse the control-flow graph and continuously update the analysis results of the basic block in the control-flow graph to complete the static analysis of the smart contract. Therefore, the basic operation related to the analysis result needs to be predefined for the static analysis, including:

predefining an operation of merging analysis results of executing a plurality of instructions for merging the analysis results after executing the plurality of instructions in the basic block of the control-flow graph;

predefining an operation for determining whether two analysis results has an inclusion relation, which is used for, according to changes of the analysis results before and after executing the basic block in the control-flow graph, determining whether the analysis result before executing the basic block is included in the analysis result after executing the basic block;

predefining an operation of merging analysis results of the basic block, which is used for, according to changes of the analysis results before and after executing the basic block in the control-flow graph, merging the analysis result before executing into the analysis result after executing;

predefining a cloning operation of the analysis results for realizing the merging of the analysis results; and predefining an operation of printing the analysis results for, according to the stack-frame structure, simulating a transmission process of a taint source of the program along with the variable in the program, and printing the analysis results so as to visually view a taint propagation process.

In the embodiment of the disclosure, the basic operation related to the analysis result is defined by designing an operation abstract class AnalysisResult of the analysis results, which is used to traverse the control-flow graph.

In the embodiment of the disclosure, the expression form of the analysis results in the static analysis is defined by defining a TaintResult class and member variables thereof, which is used to realize a data dependence analysis process.

Table 6 illustrates the member variables of the TaintResult class and connotations thereof

TABLE 6

| Variable name | Variable type | Connotation |
| --- | --- | --- |
| frame | Frame<TaintValue> | Stack frame |
| ret | TaintValue | Analysis results labeled by taint source |
| nLocals | int | Size of local-variable table |
| nStack | int | Size of stack |
| printer | InsnPrinter | Bytecode order visitor |
| interpreter | TaintInterpreter | Bytecode order interpreter |

As shown in Table 6, frame and ret in the member variables represent the expression form of the analysis results in the static analysis algorithm. The Frame class is provided by a Tree API of an ASM framework, which defines a stack-frame structure, and is used to simulate the transmission process of the analysis result labeled by the taint source in the local-variable table along with the local variables of the program. The TaintValue class defines the analysis result as a long integer. After converting the integer into a string, each character is represented by "I/O" to indicate whether it is polluted by the taint source.

The TaintResult class also depends on the InsnPrinter class and the TaintInterpreter class. The InsnPrinter class is provided by a Core API of the ASM framework and used to access the bytecode order. The TaintInterpreter class is inherited from the Interpreter abstract class and overrides an abstract method thereof for interpreting the bytecode order.

In the embodiment of the disclosure, one basic block of the control-flow graph contains a sequence of multiple bytecode orders. Therefore, after executing the basic block, the analysis results after executing the plurality of instructions needs to be merged. Therefore, the embodiment of the disclosure defines an operation of merging the analysis results of the order set in the AnalysisResult class and implements the operation in the TaintResult class. Firstly, the bytecode interpreter TaintInterpreter realized by the embodiment of the disclosure is used to acquire the current analysis results; then, the bytecode orders of the basic block are accessed in turn by using the bytecode order visitor InsnPrinter; and finally, the current analysis results and bytecode orders are passed into an execute function in the Frame class provided by the Tree API of the ASM for analysis to finally acquire the analysis results of the basic block.

Table 7 illustrates mrege codes of the analysis results of the order set.

TABLE 7

```
public AnalysisResult merge(AbstractInsnNode insn) {
    interpreter.setCurrentResult(this); //Acquire the current
    analysis result
    insn.accept(printer); //Access a bytecode order of the
    basic block
    frame.execute(insn, interpreter);
    return this;
}
```

As shown in Table 7, in the execute function, operation codes of different bytecode orders correspond to changes of different analysis results. As mentioned above, the analysis results are defined in the stack Frame class, while the local-variable table nLocals and the stack nStack are used to build the stack frame. The data dependency analysis means that the taint sources are put into the local-variable table to analyze the transmission of the taint sources in the local-variable table by executing the bytecode orders. Meanwhile, the embodiment of the disclosure defines a TaintValue class for representing the taint sources. The execute function defines changes of the TaintValue in the local-variable table nLocals and the stack nStack according to the operation codes of different bytecode orders.

In step S105, an analysis report is generated and returned according to the final analysis result.

Table 8 illustrates concrete content information of the analysis report in the embodiment of the disclosure.

TABLE 8

| Content classification | Concrete content information |
| --- | --- |
| Analysis parameter | Data source |
| Analysis result | Data dependence information, whether passing static analysis or not |
| Contract code | Contract code |
| Program control-flow graph | Program control-flow graph |

As shown in Table 8, the analysis report includes analysis parameters, analysis results, contract codes and program control-flow graph, wherein the analysis parameters and the analysis results are the main parts of the analysis report.

The analysis report may be exported as a file, such as a document in PDF format.

In the traversal of the control-flow graph, because the current basic block participating in the static analysis may serve as a subsequent block of a certain basic block together with other basic blocks, it is necessary to integrate the analysis results of all subsequent blocks into the final analysis result during one traversal.

Figure 11:
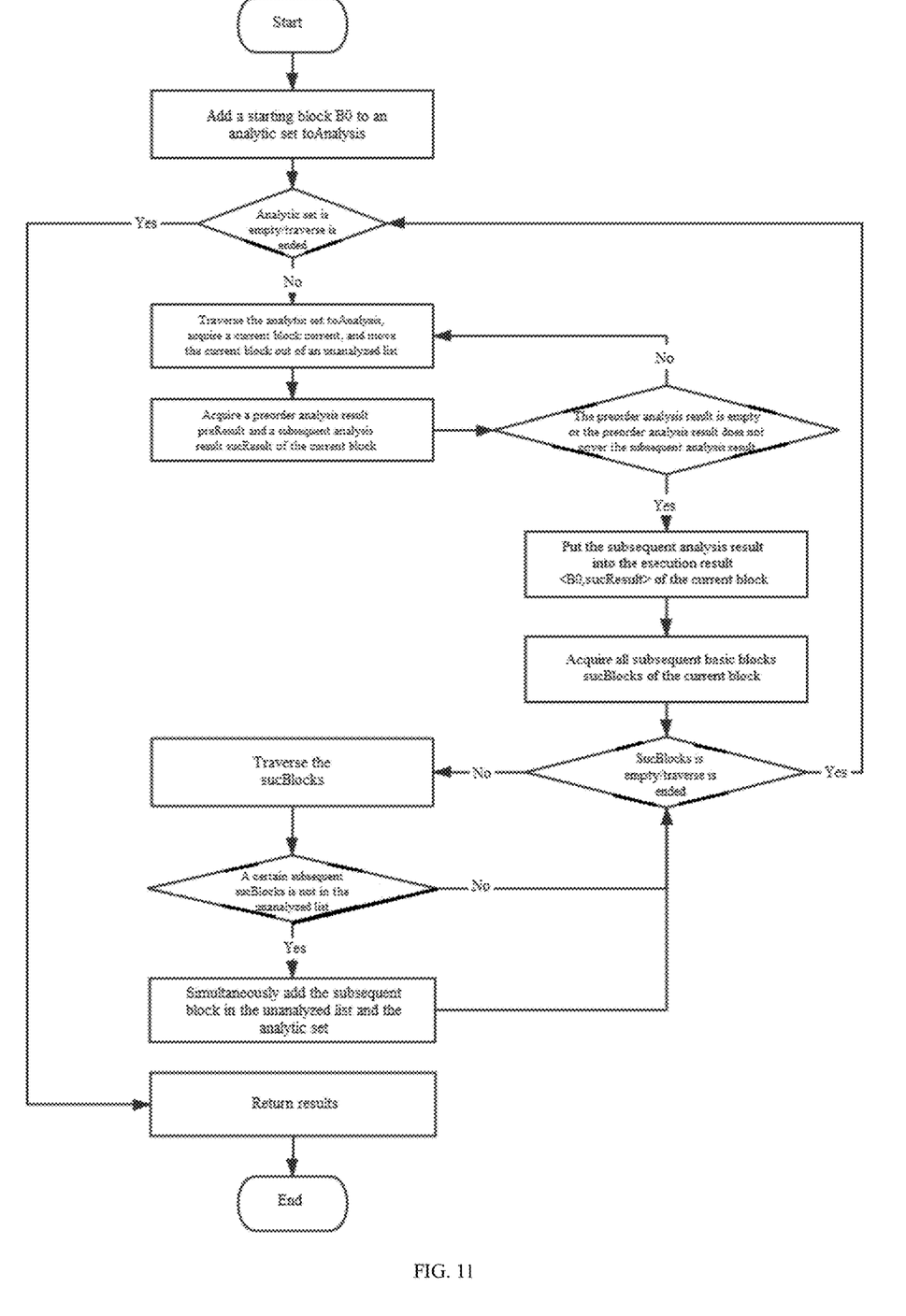
FIG. 11 is a flow chart of traversing through BFS provided by the embodiment of the disclosure.

FIG. 11 illustrates traversing through BFS provided by the embodiment of the disclosure, which is used to integrate the analysis results of all the subsequent blocks into the final analysis result in one traversal.

As shown in FIG. 11, in a preferred embodiment provided by the disclosure, based on the breadth-first search algorithm (BFS) of the graph, the analysis results of all the subsequent basic blocks of the current basic block in the control-flow graph are analyzed and integrated in a hierarchical traversing manner, and put into the set of the final analysis results. The specific process is as follows:

Table 9 illustrates BFS traversal codes provided by the embodiment of the disclosure.

TABLE 9

```
public Map<T, AnalysisResult>analysis( ) {
  results.clear( ); //Empty the analysis results
  T current = null;
  for (int i = 0; i < toAnalysis.size( ); i++) {
    current = toAnalysis.get(i); //Traverse an analytic set to acquire
    the current block
    current.setInList(false); //Move the current block out of an
    unresolved list
    AnalysisResult preResult = results.get(current); Acquire a preorder
analysis result of the current block
    AnalysisResult sucResult = execute(current); //Acquire a subsequent
```

TABLE 9-continued

```
analysis result of the current block
    //The preorder analysis result is empty or the preorder analysis
result does not contain the subsequent analysis result
    if (preResult == null || !preResult.covers(sucResult)) {
      results.put(current, sucResult.clone( ));//Use the subsequent analysis
result as the analysis result of the current block
      Collection<T>sucs = getSuc(current); //Acquire all subsequent
      blocks of the current block
        for (T next: sucs) { toAnalysis.add(next); //Add the subsequent block in the
          analytic set
          next.setInList(true); // Add the subsequent block in the
          unanalyzed list
        }
    }
}
```

As shown in FIG. 11 and Table 9, the embodiment of the disclosure provides a flow chart of traversing BFS, which specifically includes the following process; a first step is to newly build an empty analytic set list toAnalysis and add a starting block B0 into the analytic set; a second step is to determine whether the current analysis set is empty or whether the traversal is ended; if the current analysis set is empty or the traversal is ended, return a traversal result and end the traversal; if the current analysis set is not empty and the traversal is not ended, go to a third step; the third step is to traverse the analysis set toAnalysis, acquire a current block current in the analysis set, and move the current block out of an unanalyzed list; a fourth step is to acquire a preorder analysis result preResult and a subsequent analysis result sucResult of the current block, wherein the preorder analysis result and the subsequent analysis result respectively refer to analysis results of a whole algorithm before and after execution of a certain basic block; a fifth step is, if the preorder analysis result is empty, or the preorder analysis result does not cover the subsequent analysis result, put the subsequent analysis result into the execution result <B0,sucResult> of the current block; otherwise, go back to the third step; a sixth step is to acquire all subsequent basic blocks sucBlocks of the current block, and return to the second step if the sucBlocks are empty or the traversal is ended, and go to a seventh step if the sucBlocks are not empty and the traversal is not ended; the seventh step is to traverse the subsequent basic blocks sucBlocks; an eighth step is to determine that a certain subsequent basic block sucBlocks is not in the unanalyzed list, and go to a ninth step if the certain subsequent basic block sucBlocks is not in the unanalyzed list; otherwise, return to the sixth step; and a ninth step is to simultaneously add the subsequent basic block to the unanalyzed list and to the analysis set, and return to the sixth step.

In the BFS traversal process provided by the embodiment of the disclosure, the "unanalyzed list" is maintained, and after analyzing a certain basic block, the basic block needs to be moved out of the unanalyzed list. Then whether the preorder analysis result is empty and whether the preorder analysis result covers the subsequent analysis result is determined. If the preorder analysis result is empty or the preorder analysis result set is smaller than the subsequent analysis result set, it means that the analysis result after executing the basic block shall prevail and be taken as the analysis result of the whole algorithm. After analyzing the current basic block, all the subsequent basic blocks of the current basic block should be analyzed according to the steps of the BFS traversal, and unanalyzed subsequent basic blocks should be added to the analysis set list and the unanalyzed list, and then analyzed in sequence through traversal.

Moreover, the embodiment of the disclosure may also generate and return the analysis report according to the final analysis result.

It can be seen that the above method embodiment of the disclosure provides the data-control-oriented program static analysis method and system, which start from a function realization aspect of a smart contract analysis tool and are oriented to control requirements of data use, reconstruct the bytecode by compiling and interpreting the smart contract code, build and print the control-flow graph based on the analysis of the bytecode, traverse the control-flow graph of a bytecode level, perform data dependence analysis on the taint source based on the taint analysis technique, acquire the final analysis result, can define data constraints based on different data control strategies and carry out static analysis, satisfy the requirements of automatic audit of the data-control-oriented smart contracts, and ensure the accurate operation and data control of the smart contract on a data-control-oriented blockchain platform.

Second Embodiment

Figure 12:
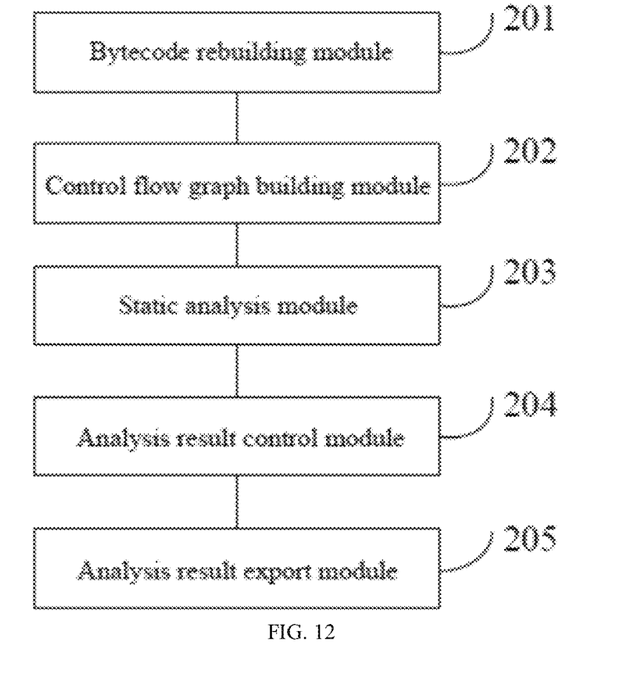
FIG. 12 is a structural block diagram of a data-control-oriented program static analysis system provided by the disclosure.

FIG. 12 is a structural block diagram of a data-control-oriented program static analysis system provided by the disclosure. As shown in FIG. 2, the system embodiment provided by the disclosure may be applied to a data-control-oriented blockchain platform, and the system specifically includes:

a bytecode rebuilding module 201 used to compile and interpret a code of a smart contract by using a contract language converter, a contract language compiler and a bytecode extractor to generate a bytecode of the code of the smart contract;

a control-flow-graph building module 202 used to resolve a control-flow relation between instructions of the bytecode by using a bytecode manipulation framework, and build and print a control-flow graph according to the control-flow relation;

a static analysis module 203 used to add a taint source in the smart contract to an analysis result of a starting block of the control-flow graph, traverse the control-flow graph, perform data dependence analysis based on a taint analysis technique, continuously update an analysis result of a basic block in the control-flow graph, and complete static analysis on the smart contract;

an analysis-result controlling module 204 used to pre-define an expression form of the analysis result and a basic operation related to the analysis result for the static analysis, control updating of the analysis result according to the definition, and return a final analysis result; and an analysis-report exporting module 205 used to, according to the final analysis result, generating and returning an analysis report.

The embodiments in the disclosure are all described step by step, the important part of each embodiment mainly lies in the difference between other embodiments, the same or similar part between each embodiment may be referred to each other.

It should be appreciated by those skilled in this art that the embodiments of the disclosure may be provided as methods, device or computer program products. Therefore, the embodiments of the disclosure may take the form of complete hardware embodiments, complete software embodiments or software-hardware combined embodiments. More-over, the embodiments of the disclosure may take the form of a computer program product embodied on one or more computer usable storage media (including but not limited to disk storage, CD-ROM, optical storage, etc.) in which computer usable program codes are included.

The disclosure is described with reference to the flow charts and/or block diagrams of the method, terminal device (system), and computer program products according to the embodiments of the disclosure. It should be appreciated that each flow and/or block in the flow charts and/or block diagrams, and combinations of the flows and/or blocks in the flow charts and/or block diagrams may be implemented by computer program orders. These computer program orders may be provided to a general purpose computer, a special purpose computer, an embedded processor, or a processor of other programmable data processing terminal device to produce a machine for the orders executed by the computer or the processor of other programmable data processing terminal device to generate a device for implementing the functions specified in one or more flows of the flow chart and/or in one or more blocks of the block diagram.

These computer program orders may also be provided to a computer readable memory that can guide the computer or other programmable data processing terminal device to work in a given manner, so that the orders stored in the computer readable memory generate a product including an order device that implements the functions specified in one or more flows of the flow chart and/or in one or more blocks of the block diagram.

These computer program orders may also be loaded to a computer, or other programmable terminal device, so that a series of operating steps are executed on the computer, or other programmable terminal device to produce processing implemented by the computer, so that the orders executed in the computer or other programmable terminal device provide steps for implementing the functions specified in one or more flows of the flow chart and/or in one or more blocks of the block diagram.

Although the preferred embodiments of the disclosure have been described, those skilled in the art can make additional changes and modifications to these embodiments once they know the basic inventive concepts. Therefore, the appended claims are intended to be interpreted as including the preferred embodiments and all the changes and modifications that fall within the scope of the embodiments of the disclosure.

Finally, it should be also noted that relational terms herein such as first and second, etc., are used merely to distinguish one entity or operation from another entity or operation, and do not necessarily require or imply there is any such relation or order between these entities or operations. Furthermore, the terms "including", "comprising" or any variations thereof are intended to embrace a non-exclusive inclusion, such that a process, method, article, or terminal device including a plurality of elements includes not only those elements but also includes other elements not expressly listed, or also incudes elements inherent to such a process, method, item, or terminal device. In the absence of further limitation, an element defined by the phrase "including a . . . " does not exclude the presence of additional identical element in the process, method, article, or terminal device.

The data-control-oriented program static analysis method and the data-control-oriented program static analysis system provided by the disclosure are described in detail above. Specific examples are applied to explain the principle and implementation of the disclosure herein. The above embodiments are only used to help understand the method of the disclosure and the core idea thereof. Meanwhile, for those of ordinary skills in the art, there will be changes in the specific implementation and application scope according to the idea of the disclosure. To sum up, the contents of this specification should not be construed as limiting the disclosure.

The invention claimed is:

1. A data-control-oriented program static analysis method, comprising the following steps:
   compiling and interpreting a code of a smart contract by using a contract language converter, a contract language compiler and a bytecode extractor to generate a bytecode of the code of the smart contract;
   resolving a control-flow relation between instructions of the bytecode by using a bytecode manipulation framework, and building and printing a control-flow graph according to the control-flow relation;
   adding a taint source in the smart contract to an analysis result of a starting block of the control-flow graph, traversing the control-flow graph, performing a data dependence analysis based on a taint analysis technique, continuously updating an analysis result of a basic block in the control-flow graph, and completing a static analysis on the smart contract;
   predefining an expression form of an analysis result of the static analysis and a basic operation related to the analysis result for the static analysis, controlling an updating of the analysis result of the static analysis according to a definition, and returning a final analysis result; and
   according to the final analysis result, generating and returning an analysis report;
   wherein the step of predefining the expression form of the analysis result for the static analysis comprises:
   for designing and simulating an execution process of the bytecode in a virtual machine, predefining a stack-frame structure to simulate a transmission process of the taint source in a local-variable table along with a local variable of a program; and
   for a global variable, predefining a heap object to represent an instance object in the global variable, wherein a reference to a labeled instance object is further allowed to be transmitted in the local-variable table.

2. The data-control-oriented program static analysis method according to claim 1, wherein the step of compiling and interpreting the code of the smart contract by using the contract language converter, the contract language compiler and the bytecode extractor to generate the bytecode of the code of the smart contract comprises:
   by using the contract language converter, grouping tokens into a token class, and translating a user-defined syntax of a contract language into a lexical analysis;
   by using the contract language compiler, constructing an abstract syntax tree according to the lexical analysis to complete a compiling process; and
   further processing the abstract syntax tree by using the bytecode extractor to complete remaining steps of the compiling process and finally generate the bytecode, wherein the remaining steps of the compiling process comprise a semantic analysis and a code generation.

3. The data-control-oriented program static analysis method according to claim 1, wherein the step of resolving the control-flow relation between the instructions of the bytecode by using the bytecode manipulation framework, and building and printing the control-flow graph according to the control-flow relation, comprises:
   by using a bytecode manipulation framework ASM, extracting and resolving a bytecode instruction sequence of a bytecode file;
   according to a preset establishment standard for the basic block of the control-flow graph, adding the bytecode instruction sequence corresponding to the basic block of the control-flow graph to the basic block of the control-flow graph, wherein the basic block of the control-flow graph is established;
   according to a determining standard for an execution flow direction between basic blocks, building the execution flow direction between the basic blocks; and
   building and printing the control-flow graph.

4. The data-control-oriented program static analysis method according to claim 3, wherein the step of extracting and resolving the bytecode instruction sequence of the bytecode file by using the bytecode manipulation framework ASM comprises:
   providing an event based bytecode manipulation model by the bytecode manipulation framework ASM by using a Core API, and
   providing an object based bytecode manipulation model by the bytecode manipulation framework ASM by using a Tree API.

5. The data-control-oriented program static analysis method according to claim 4, wherein the step of extracting and resolving the bytecode instruction sequence of the bytecode file by using the bytecode manipulation framework ASM comprises:
   rebuilding an objectified class file into a first bytecode file in a binary format by the event based bytecode manipulation model by using a Visitor and an implementation class of the Visitor, and extracting and resolving the bytecode instruction sequence of the first bytecode file; and
   resolving each first bytecode file by the object based bytecode manipulation model by using an object tree structure, rebuilding a second bytecode file by using a Node and an implementation class of the Node, and extracting and resolving the bytecode instruction sequence of the second bytecode file;
   wherein each of the first bytecode file and the second bytecode file is a class file, providing information selected from a class name, a class attribute and a bytecode instruction set.

6. The data-control-oriented program static analysis method according to claim 3, wherein the step of extracting and resolving the bytecode instruction sequence of the bytecode file by using the bytecode manipulation framework ASM comprises:
   rebuilding an objectified class file into a first bytecode file in a binary format by an event based bytecode manipulation model by using a Visitor and an implementation class of the Visitor, and extracting and resolving the bytecode instruction sequence of the first bytecode file; and
   resolving each first bytecode file by an object based bytecode manipulation model by using an object tree structure, rebuilding a second bytecode file by using a Node and an implementation class of the Node, and extracting and resolving the bytecode instruction sequence of the second bytecode file;
   wherein each of the first bytecode file and the second bytecode file is a class file, providing information selected from a class name, a class attribute and a bytecode instruction set.

7. The data-control-oriented program static analysis method according to claim 1, wherein the step of adding the taint source in the smart contract to the analysis result of the starting block of the control-flow graph, traversing the control-flow graph, performing the data dependence analysis based on the taint analysis technique, continuously updating the analysis result of the basic block in the control-flow graph, and completing the static analysis on the smart contract, comprises:

adding a taint label for a common variable in the smart contract to become a taint variable and complete identification of the taint source; and     performing an innocent processing to the taint variable, wherein the taint variable after being subjected to the innocent processing propagates dependency relations with other common variables, and the taint variable after being subjected to the innocent processing is finally converged to a taint sink to complete a taint propagation analysis.

8. The data-control-oriented program static analysis method according to claim 1, wherein the step of predefining the basic operation related to the analysis result for the static analysis comprises:

predefining an operation of merging analysis results of executing a plurality of instructions for merging the analysis results after executing the plurality of instructions in the basic block of the control-flow graph;

predefining an operation of determining whether a first analysis result obtained before executing the basic block in the control-flow graph and a second analysis result obtained after executing the basic block in the control-flow graph has an inclusion relation for, according to changes of the first analysis result and the second analysis result, determining whether the first analysis result is included in the second analysis result;

predefining an operation of merging analysis results of the basic block for, according to the changes of the first analysis result and the second analysis result, merging the first analysis result into the second analysis result;

predefining a cloning operation of the analysis results for realizing the merging of the analysis results; and     predefining an operation of printing the analysis results for, according to the stack-frame structure, simulating the transmission process of the taint source of the program along with the local variable in the program, and printing the analysis results to visually view a taint propagation process.

9. The data-control-oriented program static analysis method according to claim 1, wherein the step of generating and returning the analysis report according to the final analysis result comprises:

based on a breadth-first search algorithm (BFS) of the control-flow graph and in a hierarchical traversing manner, analyzing and integrating analysis results of all subsequent basic blocks of a current basic block in the control-flow graph, putting the analysis results into a set of the final analysis result, and according to the set of final analysis result, generating and returning the analysis report.

\* \* \* \* \*